(12) United States Patent
Johnson (10) Patent No.: US 8,605,041 B2
(45) Date of Patent: Dec. 10, 2013

(54) DATA INPUT DEVICE

(75) Inventor: Kevin Theodore Johnson, Fort Wayne, IN (US)

(73) Assignee: Kevin Theodore Johnson, Erie, PA (US)

( * ) Notice: Subject to any disclaimer, the term of this patent is extended or adjusted under 35 U.S.C. 154(b) by 1220 days.

(21) Appl. No.: 12/455,860

(22) Filed: Jun. 8, 2009

(65) Prior Publication Data

US 2010/0309114 A1    Dec. 9, 2010

(51) Int. Cl.
*G06F 3/041* (2006.01)
*G06F 17/00* (2006.01)
*G06F 19/20* (2011.01)
*G09G 5/00* (2006.01)
*H03K 17/94* (2006.01)
*H03M 11/00* (2006.01)
*A63F 9/24* (2006.01)
*A63F 13/00* (2006.01)

(52) U.S. Cl.
USPC ............... 345/173; 345/156; 341/20; 463/37

(58) Field of Classification Search
USPC .......... 345/156, 173; 341/20; 710/8; 463/36, 463/37
See application file for complete search history.

(56) References Cited

U.S. PATENT DOCUMENTS

| | | |
|---|---|---|
| 4,414,537 A | 11/1983 | Grimes |
| 4,517,424 A | 5/1985 | Kroczynski |
| 4,905,001 A | 2/1990 | Penner |
| 5,781,127 A | 7/1998 | Kleve |
| 5,796,354 A | 8/1998 | Cartabiano |
| 6,164,853 A | 12/2000 | Foote |
| 6,239,784 B1 | 5/2001 | Holes |
| 7,161,579 B2 | 1/2007 | Daniel |
| 7,295,181 B2 | 11/2007 | Alsio |

*Primary Examiner* — Srilakshmi K Kumar (57) ABSTRACT

A finger worn device is provided. The device includes individual ergonomic box elements, shaped to fit the individual fingers of the hand, and interactive surfaces on the sides of the box elements for tactile data input by the thumb. The unique locations of the interactive surfaces upon the box elements put these surfaces within the natural placement of the fingers and thumb. Thumb contacts made upon these surfaces are easy and without repeated visual confirmation of finger and thumb placement. The box elements move with their respective fingers and follow natural finger articulation. The device is well suited to operate as a hand held device and can be used as remote control, cell phone, calculator or personal data assistant.

4 Claims, 10 Drawing Sheets

DATA INPUT DEVICE

CROSS-REFERENCE TO RELATED APPLICATIONS

Not applicable

BACKGROUND

1. Field of Invention

The present invention relates generally to hand held data input devices, specifically, to an improved keypad configuration for remote control devices, cell phones and operating systems.

2. Description of Prior Art

Past attempts to solve the problem of not being able to operate the keys of held devices due to low light, poor visibility, interrupted concentration, or miniaturization of device has led to various alterations. Glow-in-the-dark keys on television remotes still require the operator's visual attention to verify contact with the correct keys. Contoured keys that stand out on devices are inconsistent from device to device. Small protrusions or bumps on keys are too small, go unnoticed and still cause confusion via loss of reference when the finger leaves the key. Stylus wands or sticks used to manipulate the small keys of small devices force the operator keep track of the even smaller device, and once the stick is lost, the device is rendered useless for data input.

U.S. Pat. No. 6,164,853 ("the '853 patent") illustrates an attempt in the art to address the issue of ergonomic hand-held devices. It is claimed that the strap maintains control of the device during key press operation. It is also claimed that the various shaped keys in the '853 patent allow the wearer to operate the device by sense of touch. However, the strap does not sufficiently stabilize the device for key presses without discomfort, the thumb keys facilitate extraneous thumb movement, and the various shaped keys do not contain sufficient contrast in contour to be quickly differentiable by the finger tips of the operator.

U.S. Pat. No. 7,295,181 ("the '181 patent") illustrates an attempt in the art to address the issue of hand-attached devices. It is claimed that the upper unit of the device maintains control of the device during key press operation. However, this attachment method is too loose for the device to register distinct movement of the finger segments. The device fits people differently, causing typing patterns created by the prior user to be misinterpreted by the device, thus the device will not function as expected.

U.S. Pat. No. 4,517,424 ("the '424 patent"), illustrates an attempt in the art to address the issue of ergonomic finger operated devices. The device claims to provide a keyboard enabling quick button pushing with less fatigue on the fingers. However, there is extreme restriction of movement to the hand, wrist, and arm. These parts of the wearer must be consciously held motionless during the operation of the device. Finger movement is hampered by placement of buttons. Buttons are located in too many places not usually accessible by the fingers. This causes the wearer confusion and results in incorrect key strokes.

U.S. Pat. No. 5,781,127 ("the '127 patent"), illustrates an attempt in the art to address the issue of finger-worn devices. The claimed device in the '127 patent claims to provide a keyboard needing minimum finger movement. However, the device restricts the fingers of the operator to the point of inducing unwanted keystrokes when attempting to move the finger after a keystroke. Also, the device must be attached to the fingers, hand, and wrist and hence overly restricts the operator's arm.

Although input devices such as these work well in certain instances, there are continuing efforts to improve their form, feel and functionality. Accordingly, there is a need to further refine the key manipulation interaction of these hand-held devices and provide a device that overcomes one or more of the deficiencies of these devices.

SUMMARY

One embodiment of the data input device comprises box elements covering the fingers of the hand, interactive surface elements for interacting with remote devices and plank elements linking a platform to the box elements.

DRAWINGS

Figures

REFERENCE NUMERALS

1 data input device
2 first box element
3 second box element
4 third box element
5 fourth box element
30 interactive surface element on the front exterior side of the first box element
32 interactive surface element on the bottom exterior side of the first box element
34 interactive surface element on the front exterior side of the second box element
36 interactive surface element on the bottom exterior side of the second box element
38 interactive surface element on the front exterior side of the third box element
40 interactive surface element on the bottom exterior side of the third box element 42 interactive surface element on the front exterior side of the fourth box element
44 interactive surface element on the bottom exterior side of the fourth box element
46 platform element
48 plank element
50 rigid member
52 spring element
101 the first touch sensitive area of the interactive surface element on the front exterior side of the first box element
102 the second touch sensitive area of the interactive surface element on the front exterior side of the first box element
103 the third touch sensitive area of the interactive surface element on the front exterior side of the first box
104 the first touch sensitive area of the interactive surface element on the bottom exterior side of the first box
105 the second touch sensitive area of the interactive surface element on the bottom exterior side of the first box
106 the third touch sensitive area of the interactive surface area on the bottom exterior side of the first box element
107 the first touch sensitive area of the interactive surface element on the front exterior side of the second box element
108 the second touch sensitive area of the interactive surface element on the exterior front side of the second box element
109 the third touch sensitive area of the interactive surface element on the front exterior side of the second box element
110 the first touch sensitive area of the interactive surface element on the bottom exterior side of the second box element
111 the second touch sensitive area of the interactive surface element on the bottom exterior side of the second box element
112 the third touch sensitive area of the interactive surface element on the bottom exterior side of the second box element
113 the first touch sensitive area of the interactive surface element on the front exterior side of the third box element
114 the second touch sensitive area of the interactive surface element on the front exterior side of the third box element
115 the third touch sensitive area of the interactive surface element on the front exterior side of the third box element
116 the first touch sensitive area of the interactive surface element on the bottom exterior side of the third box element
117 the second touch sensitive area of the interactive surface element on the bottom exterior side of the third box element
118 the third touch sensitive area of the interactive surface element on the bottom exterior side of the third box element
119 the first touch sensitive area of the interactive surface element on the front exterior side of the fourth box element
120 the second touch sensitive area of the interactive surface element on the front exterior side of the fourth box element
121 the third touch sensitive area of the interactive surface element on the front exterior side of the fourth box element
122 the first touch sensitive area of the interactive surface element on the bottom exterior side of the fourth box element
123 the second touch sensitive area of the interactive surface element on the bottom exterior side of the fourth box element
124 the third touch sensitive area of the interactive surface element on the bottom exterior side of the fourth box element

DESCRIPTION

FIGS. 1, 2, 3, 4, 5, 6, 7, 8—of the Preferred Embodiment

Figure 1:
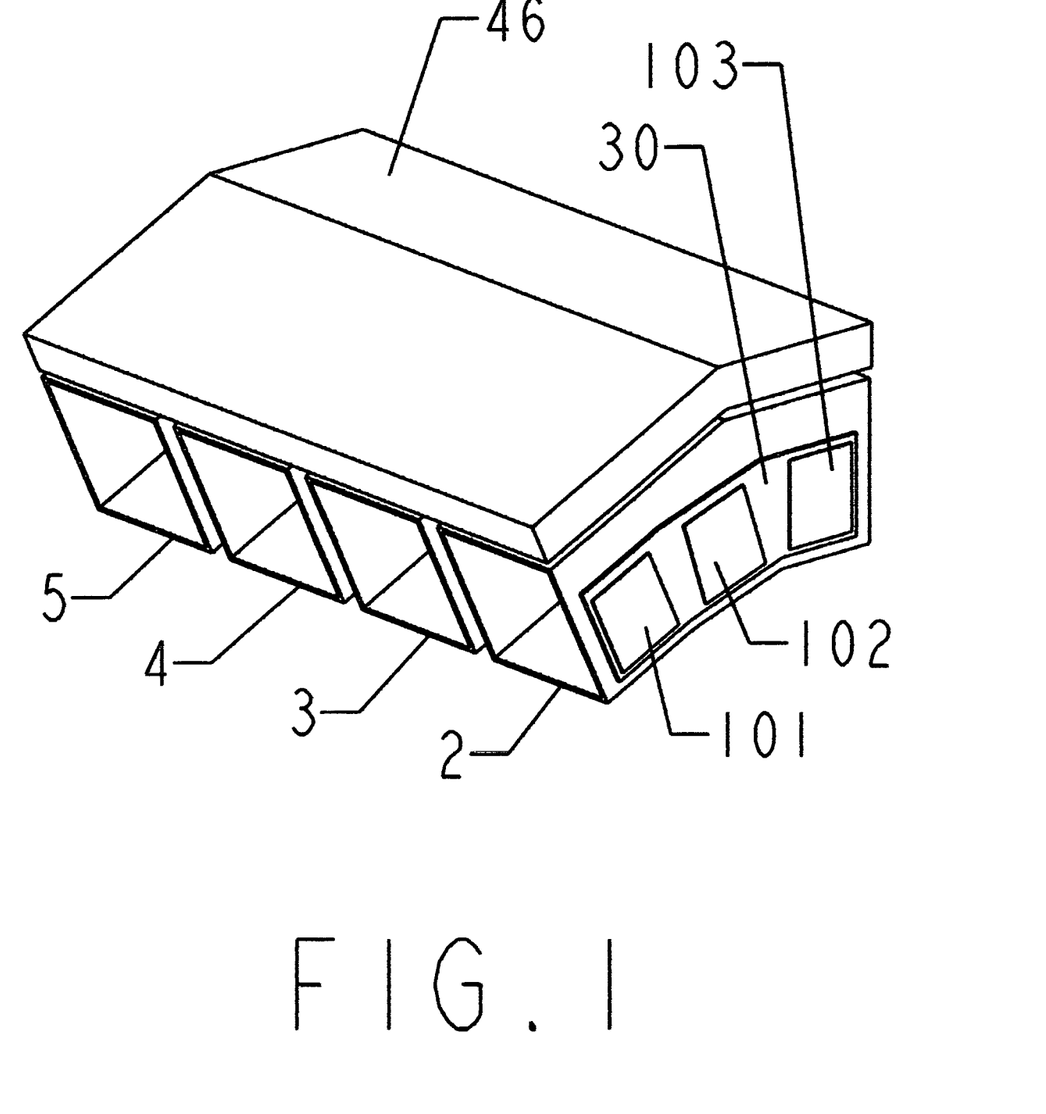
FIG. 1 shows a perspective view of the device.

The invention will now be described in more detail with reference to the embodiments shown in the accompanying Figures. The following described embodiment is only presented by way of example and should not be construed as limiting the inventive concept to any particular physical configuration. FIG. 1 shows a perspective view of the data input device 1.

The platform element 46 is positioned above the box elements. The platform element 46 is a rectangular structure that possesses a syncline or angled profile. The sides of the platform element contain planar areas.

The box elements are positioned below the platform element 46. There are four box elements. The box elements are rectangular protrusions that possess syncline or angled profiles. The sides of the box elements contain planar areas. The box elements possess one or more openings for inserting the fingers of the wearer. Each box element comprises a front side possessing a syncline or angled profile and containing planar areas; a back side, opposite the front side, possessing a syncline or angled profile and containing planar areas; a top side interposed between the upper portion of the back side and the upper portion of the front side; a bottom side interposed between the lower portion of the front side surface and the lower portion of the back side; and interior side all opposite of, front, rear, top, and bottom sides, respectively.

The box elements are positioned adjacent to each other and are referred to as the first box element 2, the second box element 3, the third box element 4, and the fourth box element 5. Each individual box element contains interactive surface elements on its exterior front and bottom sides. The box elements are all of the same relative shape.

Figure 2:
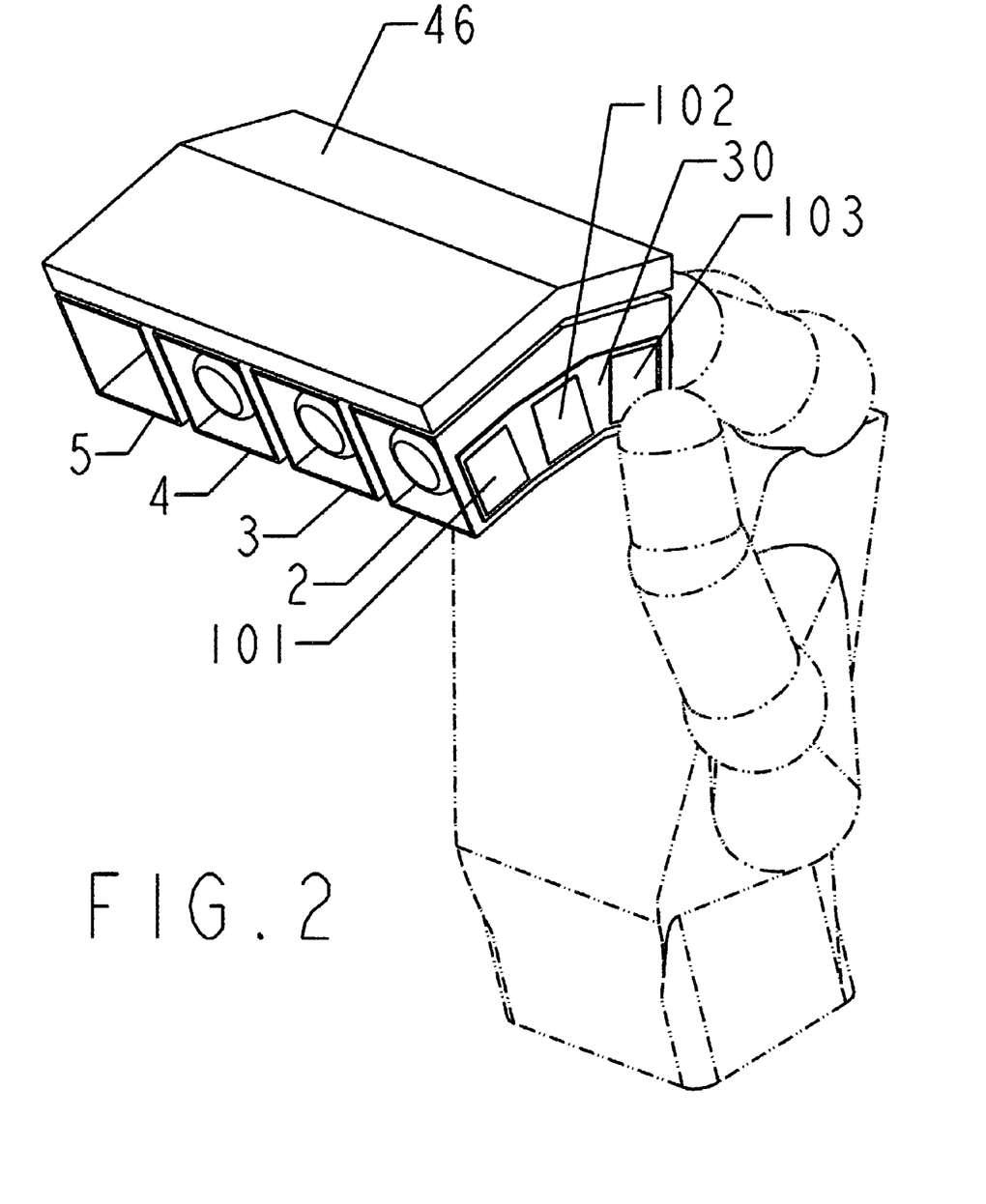
FIG. 2 show a perspective view of the device relative to a hand model.

Of the hand of the wearer, the index finger is housed in the first box element 2, the middle finger is housed in the second box element 3, the ring finger is housed in the third box element 4, and the little finger is housed in the fourth box element 5. FIG. 2 shows the fingers of the model hand in the box elements. Though not shown, ridges are included on the interior sides of the box elements for enhancing the stability of the box elements.

Figure 3:
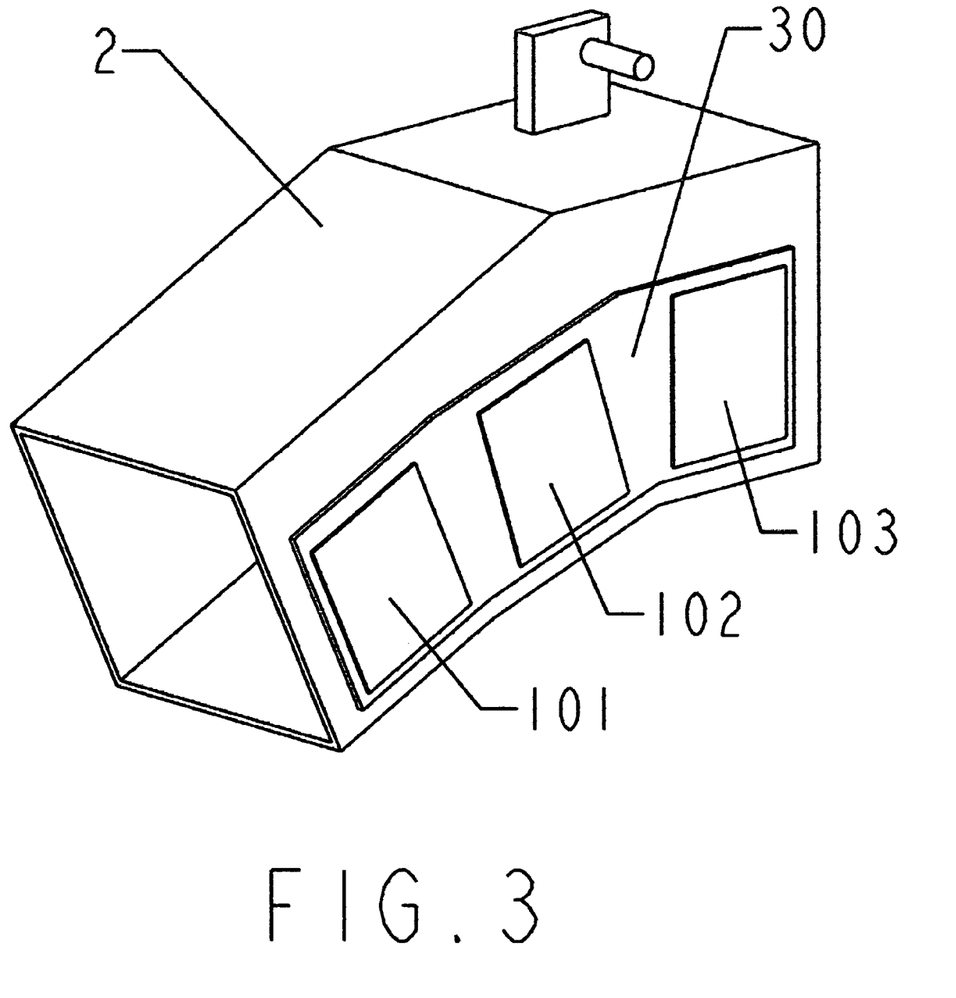
FIG. 3 shows a perspective view of front side of the first box element.
Figure 4:
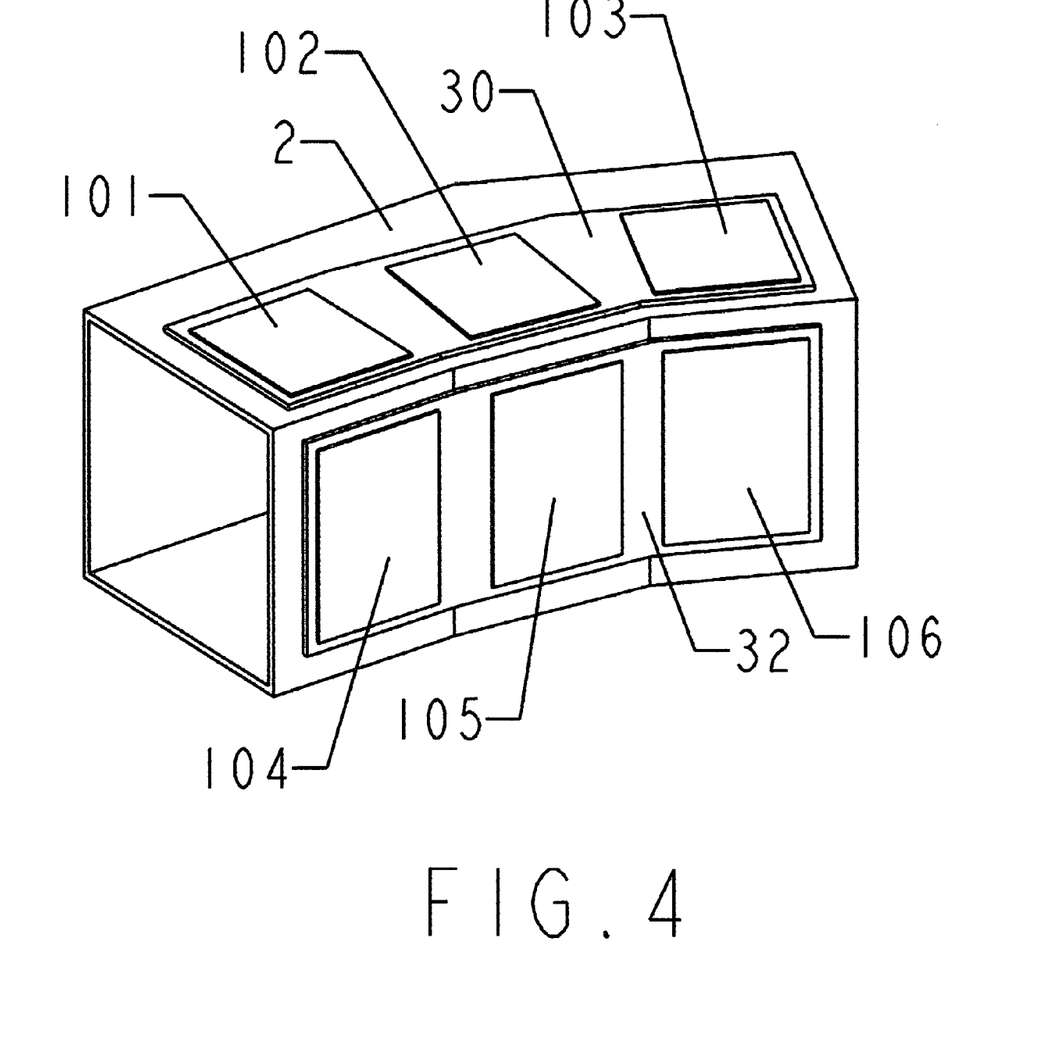
FIG. 4 shows a perspective view of bottom side of the first box element.

FIG. 3 shows a perspective view of the first box element 2 and the interactive surface element on the front side of the first box element 30. FIG. 3 also shows an interactive surface element containing three touch screen areas 101, 102, 103 on the front side of the box element. FIG. 4 also shows an interactive surface element on the bottom side of the first box element 2. In this embodiment, each interactive surface element contains one row of three touch sensitive areas. Touch sensitive areas are individual contact points. The touch sensitive areas align with the interactive surface element to which they are attached. The interactive surface elements align with the sides of the box element.

Figure 7:
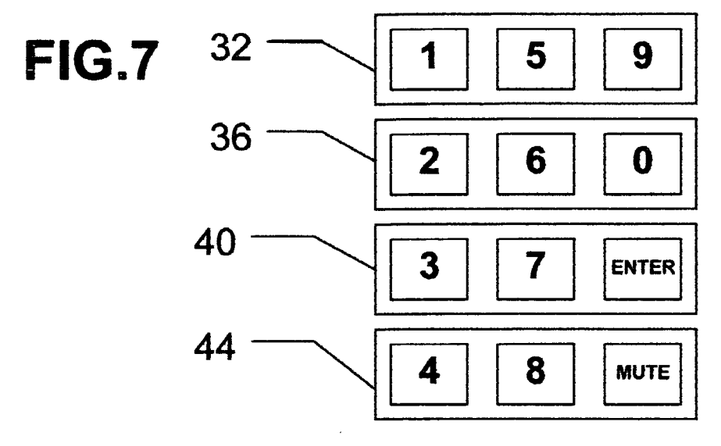
FIG. 7 shows the schematic outline of numeric button layout of the box elements.
Figure 8:
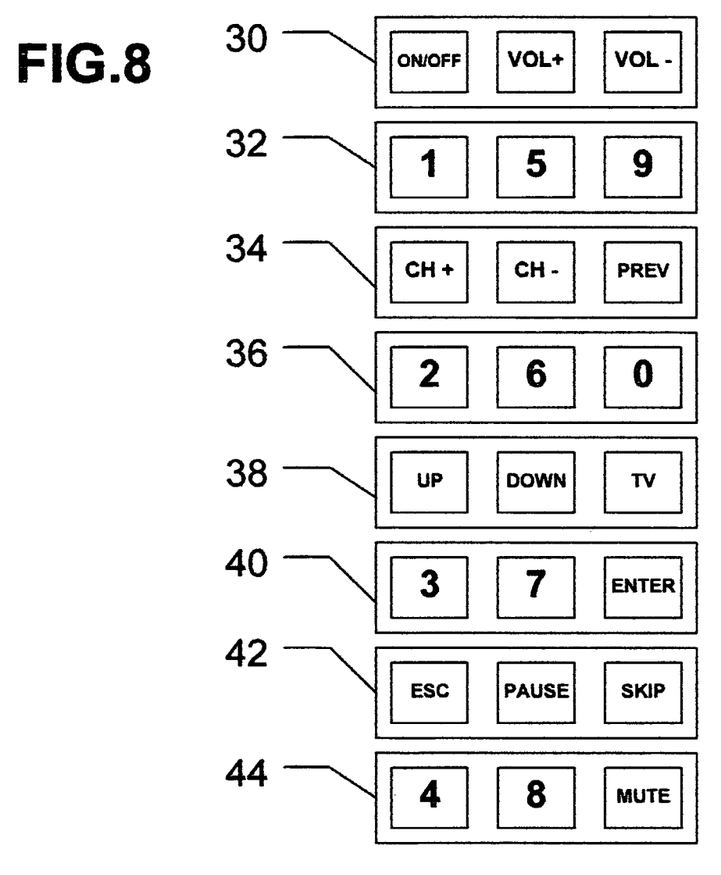
FIG. 8 shows the schematic outline of entire button layout of the box elements.

FIG. 7 shows the layout of the numerical key arrangement of the bottom side of the aligned four box elements. FIG. 8 shows the complete layout of the key arrangement of adjacent interactive surface elements.

Figure 5:
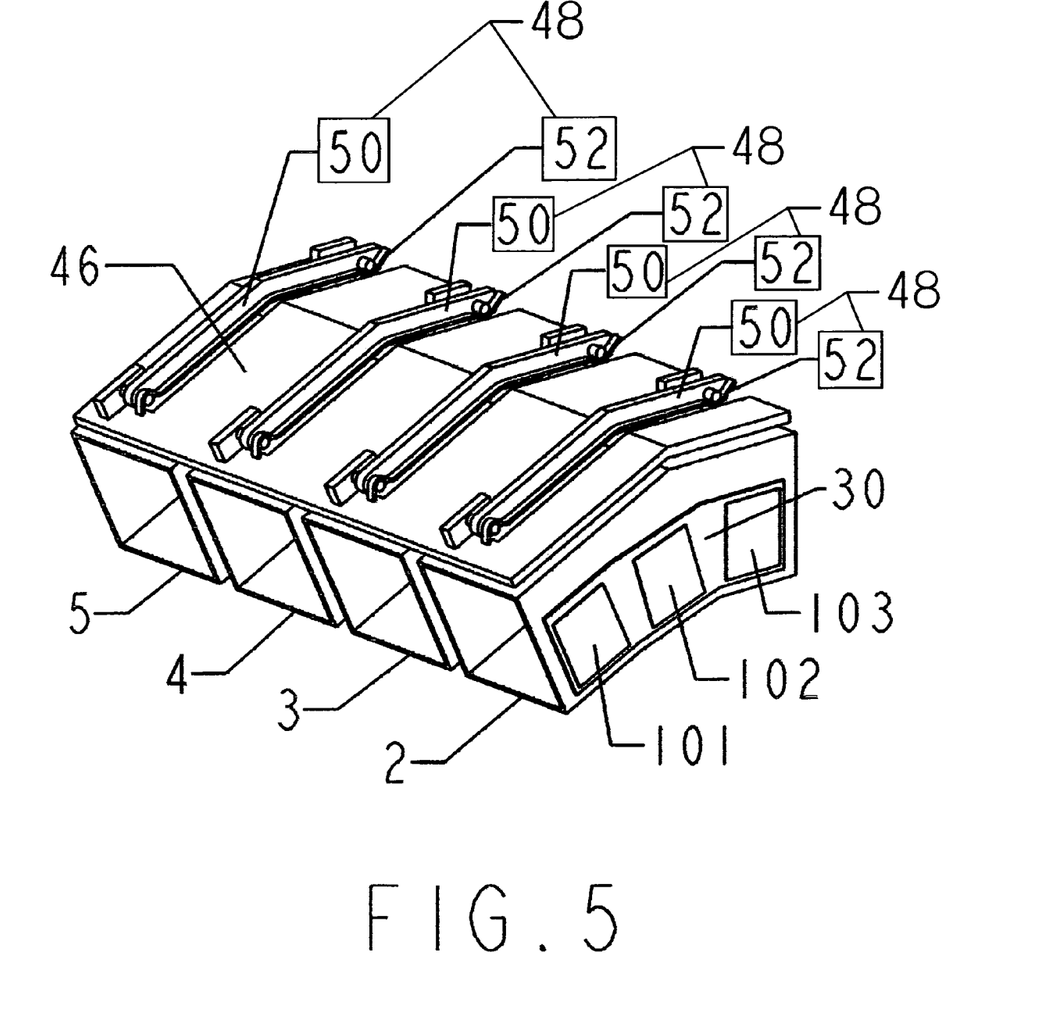
FIG. 5 shows a perspective view of the device, with top cover of platform element removed.
Figure 6:
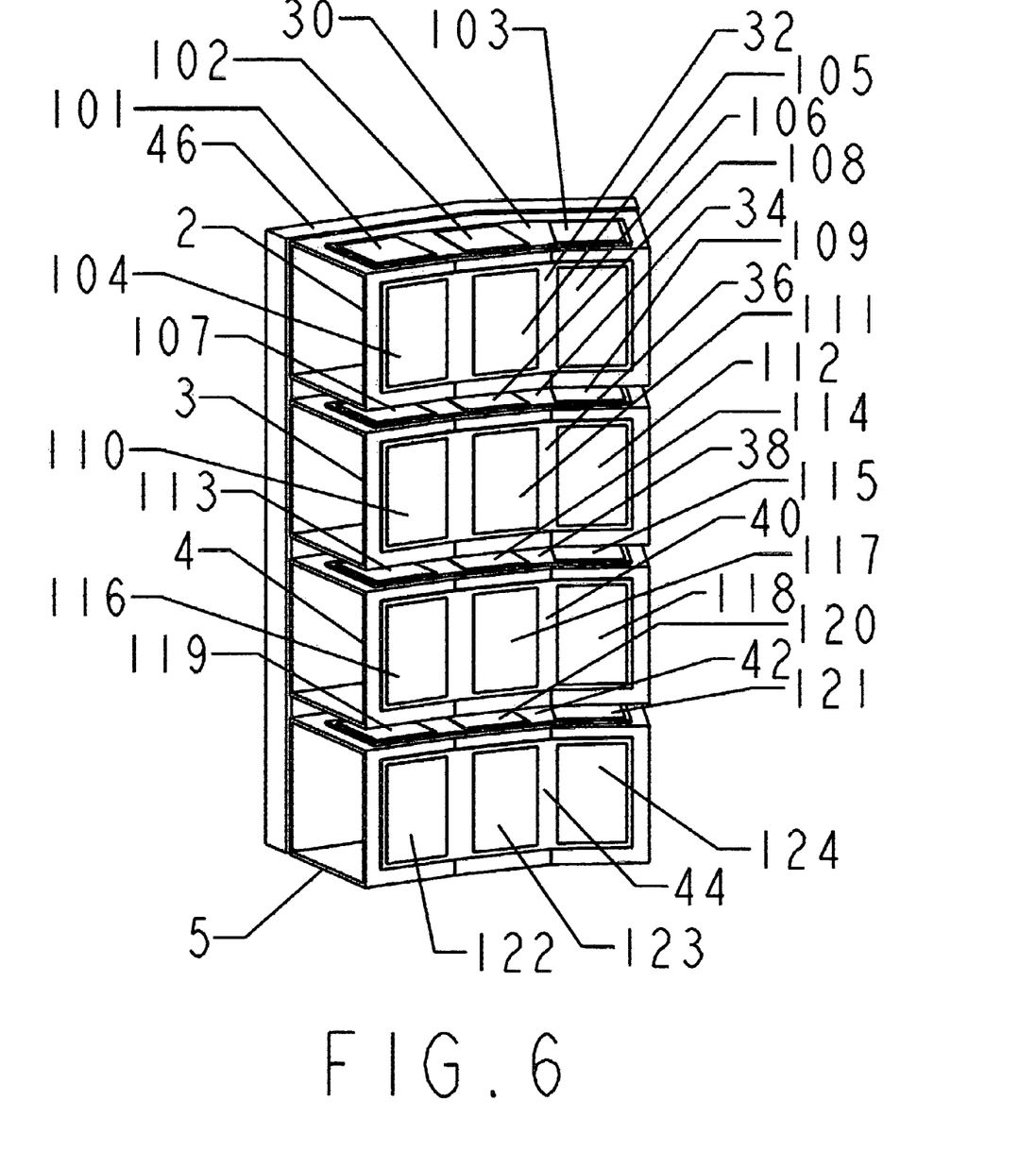
FIG. 6 shows a perspective view of the device, showing bottom sides of the box elements.

FIG. 5 shows plank elements 48 connected to the box elements and to the platform element 46. Plank elements 48 are connected to the box elements and also connected to the platform element 46. A plank element 48 include a rigid member 50 and a spring element 52. A rigid member 50 is a flat protrusion with a curved or angled profile. There are four plank elements 48.

FIG. 5 shows spring elements 52 connected to box elements and to the platform elements 46. Spring elements 52 are connected to the box elements and also connected to the platform element 46. A spring element 52 is a flat protrusion with a curved or angled profile and possessing a spring bias. There are four spring elements 52. The spring elements are positioned adjacent to the rigid members.

It will be understood that the above described embodiment of the present invention are susceptible to various modifications, changes, and adaptations, and the same is intended to be comprehended within the meaning and range of equivalents of the appended claims. Further, although a number of equivalent components may have been mentioned herein which could be used in place of the components illustrated and described with reference to the described embodiment, this is not meant to be an exhaustive treatment of all the possible equivalents, not to limit the invention defined by the claims to any particular equivalent or combination thereof. A person skilled in the art would realize that there may be other equivalent components presently known, or to be developed, which could be used within the spirit and scope of the invention defined by the claims.

Operation

The device is worn by the fingers. The plank elements link the box elements to the platform element and allow the box elements to move parallel to one another. There are four plank elements. Each plank element 48 connects each box element to the platform element 46. One plank element 48 connects to one box element and also to the platform element 46 and allows each box element to pivot and follow the natural movement of the fingers of the wearer, while maintaining a distance from the other box element. The platform element 46 stabilizes the box elements. The spring elements 52 each produce a spring bias during movement of the box elements.

To operate the device 1, the wearer, inserts the index finger into the first box element 2, the middle finger into the second box element 3, the ring finger into the third box element 4, and the little finger into the fourth box element 5. The box elements engage each finger about the sections and knuckles. FIG. 2 shows the fingers of the model hand inserted into the box elements. The wearer then contacts the touch sensitive areas of the interactive surface elements which invokes data to be transferred and thereby interacts with remote devices.

To make contact with the touch sensitive areas of the interactive surface elements, the wearer moves fingers and thumb and makes thumb contacts onto the touch sensitive areas attached to the box elements.

To operate the device 1 as a remote control for a television, the wearer makes contact with the touch sensitive areas to turn on the television, to change the channel, adjust the volume and so on. Each individual box element contains interactive surface elements on its exterior front and bottom sides. The interactive surface elements on the front and bottom sides of the box element each consist of one row of three touch sensitive areas. See FIG. 4.

The first, second, and third touch sensitive areas on the front side of the first box element 2 represent the command control touch sensitive areas of the box elements. Thumb contacts onto these touch sensitive areas results in a command such as to increase or decrease volume, channel number, or enact mute, skip channel, reset, display program menu, play CDs, on/off, and all the commands associated with hand held devices. See FIG. 8.

The touch sensitive areas of the interactive surface elements of the bottom sides of all four box elements are assigned number values from 0 to 9. See FIG. 7. These touch sensitive areas are the channel control keys. Thumb contacts onto these touch sensitive areas result in the command to switch channels. For example, the fourth 104 and tenth 110 touch sensitive areas have values of 1 and 2, and thumb contacts to those two touch sensitive areas, respectively, results in the command to change to channel 12.

The wearer inserts the index finger into the first box element 2. The three touch sensitive areas of the interactive surface element on the bottom side of the first box element 2, touch sensitive areas four 104, five 105, and six 106, align with the finger tip, the first finger segment, and the second finger segment, respectively, of the index finger of the wearer. Therefore, touch sensitive areas four 104, five 105, and six 106, align with the numbers 1, 5, and 9, respectively. Therefore, the numbers 1, 5, and 9, are directly associated with the finger tip, the first finger segment, and the second finger segment, respectively, of the index finger.

The three touch sensitive areas of the interactive surface elements of the bottom sides of the second box element 3, third box element 4, and fourth box element 5 align with the finger tip, first finger segment, and second finger segment of the middle finger, ring finger, and the little finger, respectively. It therefore follows that the numbers 2, 6, and 0, are directly associated with the finger tip, the first finger segment, and the second finger segment, respectively, of the middle finger; the number 3, 7, and the ENTER command, are directly associated with the finger tip, the first section and the second section, respectively, of the ring finger; and the numbers 4, 8, and PRE, for previous channel, are directly associated with the finger tip, the first section and the second section, respectively, of the little finger.

A command can also result from one or more thumb swipes across one or more touch sensitive areas. As the thumb makes contact with specific touch sensitive areas, the thumb moves or progresses along a path relative to the interactive surface element and relative to the box element, respectively, resulting in a unique command being executed.

The movement of the thumb during path progression is the pattern or outline made by the thumb swipe as the thumb progresses from some initial contact on some touch sensitive area to some terminal contact on the same or some other touch sensitive area. These path progressions take place across one or more interactive surface element and on one or more box elements. The thumb path can outline geometric shapes relatives to the interactive surface elements.

As specific control commands become directly associated with specific segments of the fingers, the operation of the device becomes a subconscious action. The alignment of the interactive surface elements position the numbered touch sensitive areas so that the wearer uses these touch sensitive areas in the same way as counting on one's finger tips. Although counting on one's finger tips, 'finger counting,' does not require looking at the fingers when counting, this method is limited to counting up to 4. The embodiment of my data input device, for controlling remote devices, expands on the finger counting method and allows the wearer various ways to count and calculate far beyond 4.

ADDITIONAL EMBODIMENTS

Figure 9:
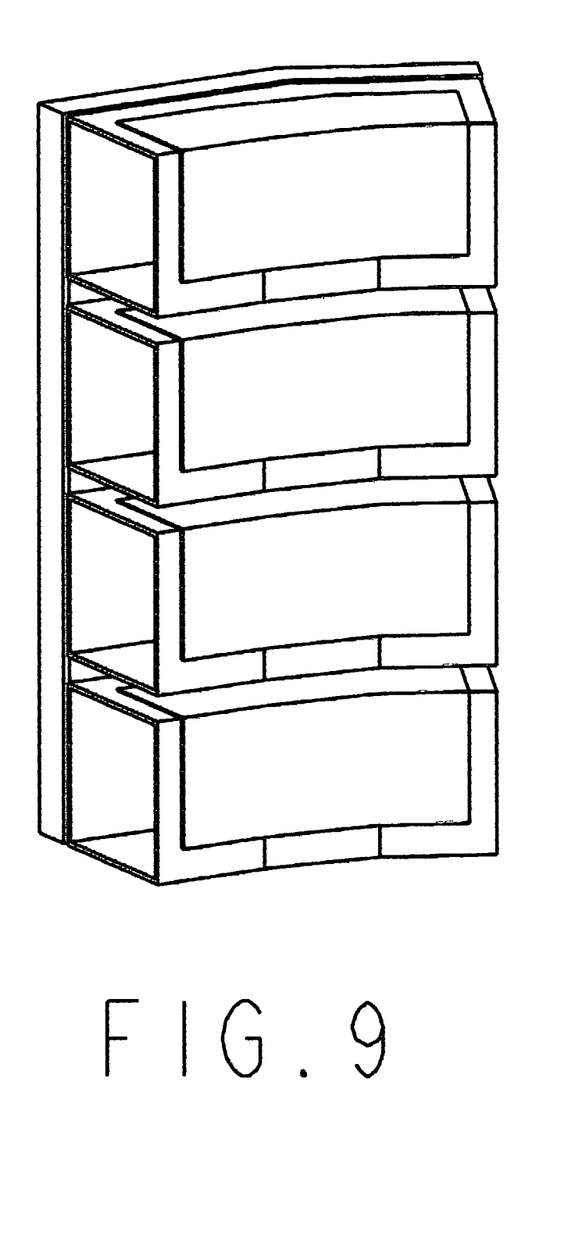
FIG. 9 show a perspective view of an additional embodiment, showing touch screens of the box elements.

In another embodiment of the device the interactive surface elements are replaced by touch screens, or touch pads. See FIG. 9.

Figure 10A:
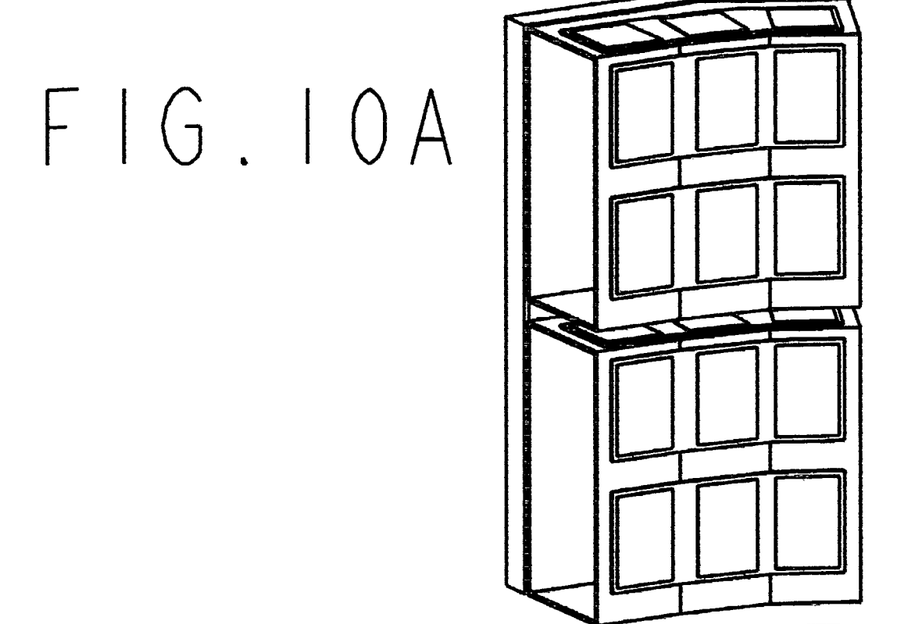
FIG. 10A show a perspective view of an additional embodiment, showing a device with two box elements.
Figure 10B:
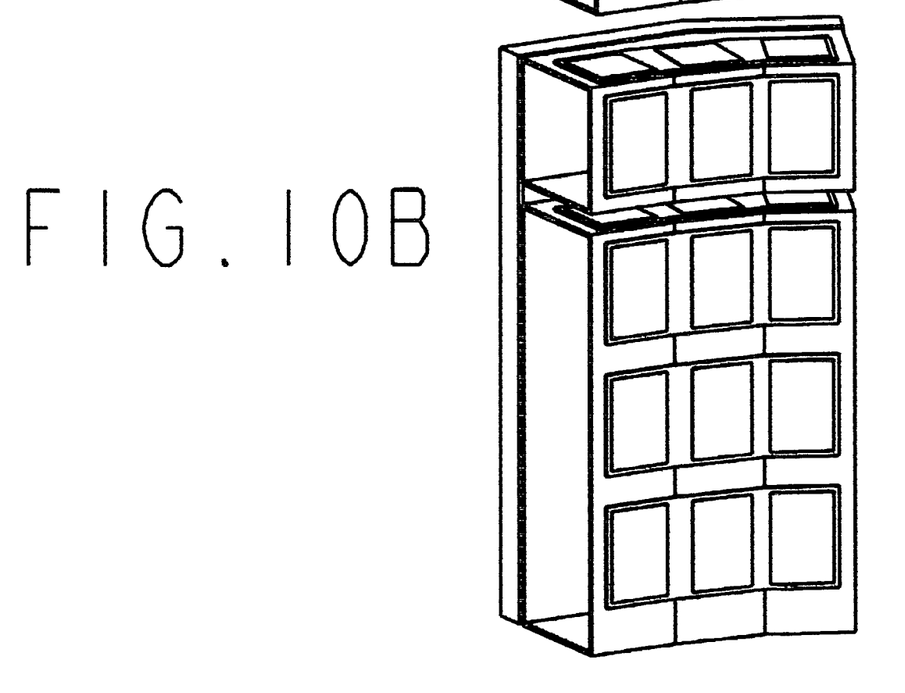
FIG. 10B shows a perspective view of additional embodiment, showing a device with two box elements.
Figure 10C:
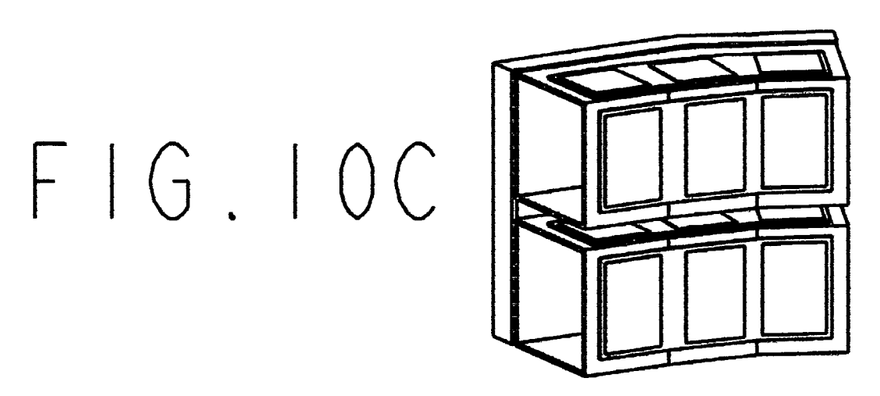
FIG. 10C shows a perspective view of additional embodiment for two fingers.
Figure 10D:
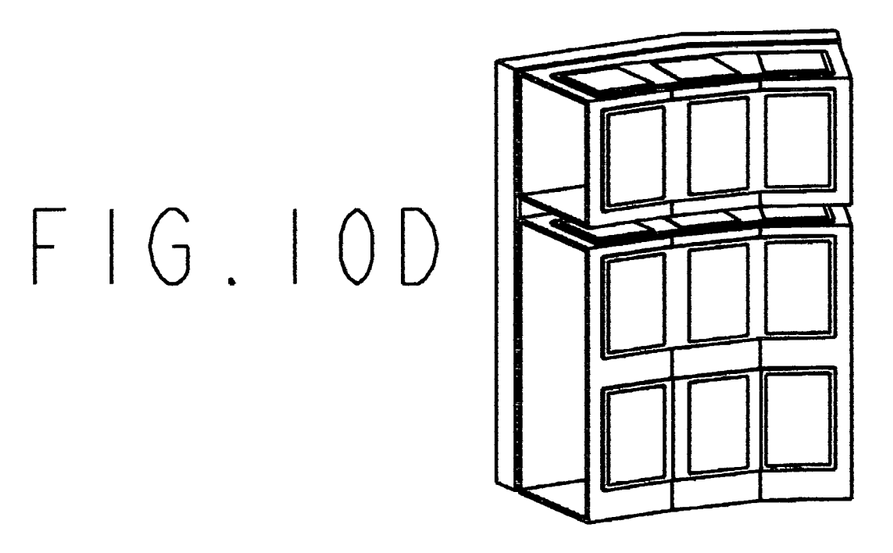
FIG. 10D shows a perspective view of additional embodiment for three fingers.

Other embodiments allow for combinations of box elements. FIG. 10A shows an embodiment which allow two fingers in one box element and two fingers in the other box element. FIG. 10B shows an embodiment which allow one finger in one box element and three fingers in the other box element. FIG. 10C shows an embodiment which allow one finger in one box element and one finger in the other box element. FIG. 10D shows an embodiment which allow one finger in one box element and two fingers in the other box element.

ADVANTAGES

Several advantages of the embodiments are:

(a) The angled shaped of the platform element, the box element and the plank elements allow these components to fit closely together and create an efficient hand profile when operating the device.

(b) The angled shape of the box elements allow a wearer's fingers to naturally engage the box elements, and sliding easily onto the fingers, fitting around and up to the second knuckle of each finger.

(c) The entire device remains stable on the hand without the wearer having to maintain a constant grip on the device.

(d) A constant grip on the device is not required because as one finger moves towards the thumb for contact onto a touch sensitive area, the other fingers move to balance that action.

(e) Further stabilization of the device is established as a result of groves and ridges on the interior sides of the box elements which enhance the support of the fingers.

(f) Two interactive surface areas on adjacent sides can operate as one interactive surface element.

(g) The interactive surface elements enable the wearer to operate the device without looking at the touch sensitive areas or the device in general.

(h) Feedback information and communication through specific interactive surface elements and box elements is specialized and unique to the wearer.

(i) The spring elements apply a return effort on the box elements. The spring elements facilitate the return of the box elements to their initial positions beneath the platform element and maintain an efficient streamlined profile relationship between the hand and device.

CONCLUSIONS, RAMIFICATIONS AND SCOPE

In one embodiment, the platform element can be eliminated or reduced in size. The overall shape of the platform element can become dependent upon specific remote devices.

In one embodiment, the box elements can possess curved profiles and side that contain planar areas. The top and bottom sides of the box elements can have fewer planar areas. Each box element can comprise left and right sides having straight profiles. Each box element can cover each entire finger of the wearer. The box elements may be flexible, and allow the individual finger segments of the box element to move relative to each segment of the box element. More than one degree of freedom can be introduced to the segments of the box elements for lateral and pitch movement. The box elements can change in size or shape depending upon the wearer or the application for which the embodiment is used.

In one embodiment, the box elements can be wireless and individual power supplies can be placed into one or more box elements.

In one embodiment, the number of touch sensitive areas on one or more the interactive surface elements can change.

In one embodiment, the plank elements are eliminated and the box elements connect directly to the platform element.

In one embodiment, the number and shape of plank elements is modified depending on the application of the device. The plank elements can be developed into one single unit.

In one embodiment, the spring and rigid members can be combined into a single element. The spring and rigid members can be incorporated into the platform element.

In one embodiment, interactive surface elements can be added to the platform element. A viewing screen, touch screen, or touch pad can be attached to the platform element.

In one embodiment, thumb swipes can be accompanied by or result in sound signals.

In one embodiment, one or more touch sensitive areas can function as a trackballs.

In one embodiment, one or more touch sensitive areas can bear alphabetical letter on the buttons.

In one embodiment, the interactive surface elements are touch screens and the pushbuttons are simulated graphic components.

In one embodiment of the device the box elements can operate with fewer sides.

In one embodiment, the box elements can have a combination of keypads and touch pads.

In one embodiment, interactive surface elements on the interior sides of the box elements supply tactile feedback to the wearer's fingers. The ridges on the interior sides of the box elements can operate as tactile sensors.

The shape of the device enables the wearer to operate the device without looking at it. There is no strain on the hand or fingers when using the device. The touch sensitive areas are positioned in the most familiar places. The device utilizes the natural contact point between the fingers and the thumb.

Although the description above discusses various specific modifications, these modifications should not be construed as limiting the scope of the embodiments but merely providing illustrations of some of the presently preferred embodiments. Thus the scope of the embodiments should be determined by the appended claims and their legal equivalents, rather than by the example given.

What is claimed is:

1. A multiple-finger-worn data input device for communication and transferring data remote devices, comprising:

(a) a plurality of box elements, for engaging the finger segments of the wearer, said box elements being rectangular protrusions having angled profiles, said rectangular protrusions comprising a front side, a back side, a top side, and a bottom side, said front side having an exterior side and an interior side, said back side having an exterior side and an interior side, said top side having an exterior side and an interior side, said bottom side having an exterior side and an interior side, each of said plurality of box elements having at least one opening for inserting each of said fingers of said wearer, said front side exterior side having interactive surface elements, said back side exterior side having interactive surface elements, said top side exterior side having interactive surface elements, said bottom side exterior side having interactive surface elements, each of said interactive surface elements having at least one row of planar touch sensitive areas, each of said planar touch sensitive areas being responsive to thumb contacts for invoking data to interact with said remote devices, said top side interior side supplying tactile feedback to said wearer's fingers, said back side interior side supplying tactile feedback to said wearer's fingers, said top side interior side supplying tactile feedback to said wearer's fingers, said bottom side interior side, supplying tactile feedback to said wearer's fingers, said front side interior side containing ridges for stabilizing said box element, for supporting inserted finger, and for functioning as tactile sensors, said back side interior side containing ridges for stabilizing said box element, for supporting inserted finger, and for functioning as tactile sensors, said top side interior side containing ridges for stabilizing said box element, for supporting inserted finger, and for functioning as tactile sensors, said bottom side interior side containing ridges for stabilizing said box element, for supporting inserted finger, and for functioning as tactile sensors;

(b) a platform element; and (c) a plurality of plank elements, each of said plank elements having at least one rigid member and at least one spring element, each of said plank elements being pivotally connected at one end to said platform element, each of said plank elements being pivotally connected at the other end to each of said box elements, respectively, for allowing each of said box elements to follow the natural movement of said inserted finger, respectively, and for allowing each of said box elements to move parallel to adjacent box elements, said spring elements producing spring bias to said box elements during movement, for facilitating the return of said box elements to their initial position beneath said platform element for maintaining a streamlined profile.

2. The device of claim 1, wherein said at least one row of planar touch sensitive areas contain more than two planar touch sensitive areas.

3. The device of claim 1, wherein said planar touch sensitive areas, each planar touch sensitive area profile is angled with respect to one another.

4. The device of claim 1, wherein said planar touch sensitive areas being responsive to thumb contacts, planar touch sensitive areas being responsive to contacts by the digits of a free hand.

* * * * *